UNITED STATES PATENT OFFICE.

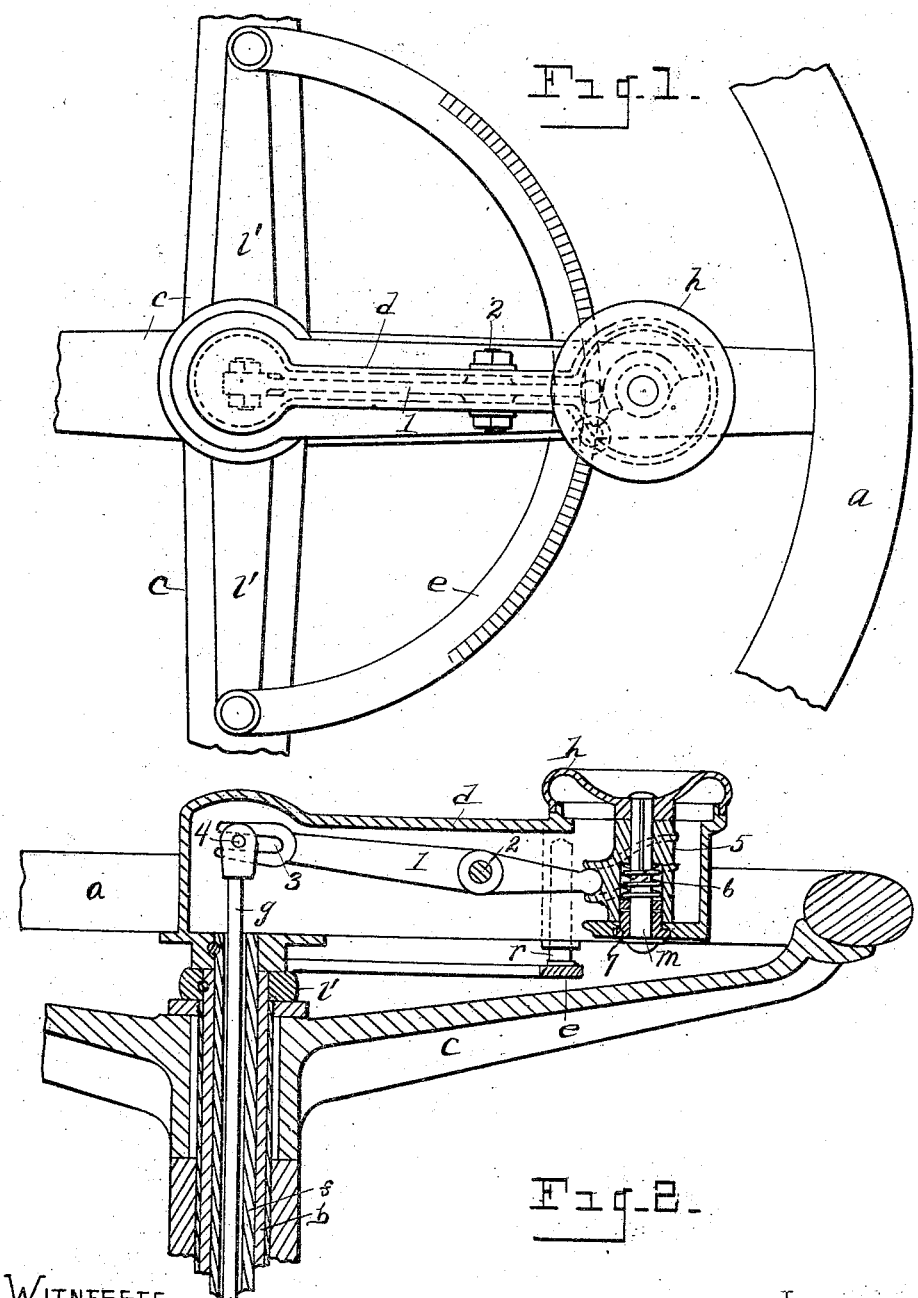

HOWARD E. COFFIN, OF DETROIT, MICHIGAN, ASSIGNOR TO E. R. THOMAS DETROIT CO., OF DETROIT, MICHIGAN, A CORPORATION OF MICHIGAN.

MEANS FOR CONTROLLING AUTOMOBILES.

951,984.  Specification of Letters Patent.  Patented Mar. 15, 1910.

Original application filed August 4, 1906, Serial No. 329,139. Divided and this application filed August 4, 1906. Serial No. 329,140.

*To all whom it may concern:*

Be it known that I, HOWARD E. COFFIN, a citizen of the United States, residing at Detroit, county of Wayne, State of Michigan, have invented a certain new and useful Improvement in Means for Controlling Automobiles, of which the following is a specification, reference being had to the accompanying drawings, which form a part of this specification.

My present invention is designed to provide certain novel improvements in controlling mechanism for automobiles, and it consists of the structure hereinafter described and claimed and illustrated in the accompanying drawings, in which, Figure 1 is a view in plan illustrating features of my invention. Fig. 2 is a view in vertical section.

The features of construction embodied herein are generically embraced in an application for controlling mechanism for automobiles prepared and executed by me of even date herewith, Serial No. 329,139, filed the 4th day of August, 1906.

My invention embodies mechanism for the purpose described arranged so that there may be simultaneous movements of the devices controlling the spark and the throttle, the invention, however, permitting the sparking device to be controlled independently of the control of the throttle controlling mechanism and vice versa.

I carry out my present invention as follows:

In the drawings *a* represents an ordinary steering rim engaged upon any suitable steering post *b* to actuate the post, and *c* represents the spider carrying the rim, which may be of any desired construction, the same being shown herewith sleeved about the steering post. A tubular shaft is indicated at *f*, the same being designed to be connected by suitable mechanism (not shown) at the lower extremity thereof to the throttle valve of the carbureter. An inner rod or staff is also shown at *g* designed to be connected at its lower extremity by any suitable mechanism (not shown) with the ordinary commutator or spark controlling device. A lever arm is indicated at *d* mounted upon the shaft *f* to actuate the same, said arm being so mounted upon the axial center of the steering wheel or rim as to be rotatable about said center, its various positions being maintained by means of a segment *e* and a pawl *r*.

Upon the outer end of the lever arm *d* I provide a knob serving as a hand grip indicated at *h* rotatable upon its axis, this hand grip being connected by any suitable mechanism with the staff *g*, so that when a rotary motion is imparted to the hand grip upon its axis, it may be made to cause a vertical movement of said staff. In my application above referred to, filed simultaneously herewith, I have shown and described mechanism for giving both a partial rotation to said staff, and a vertical movement thereof, and in addition to the generic features common to both modifications, I have laid claim specifically to mechanism for rotating said staff. My present invention aims to cover in addition, mechanisms for securing a vertical movement of said staff to actuate the commutator or spark controlling device. The segment *e* may be supported in any desired manner, as upon arms 1'. The hand grip is rigidly mounted upon a partially rotatable post *m*, the staff *g* being engaged by a lever indicated by the numeral 1 fulcrumed as at 2 to the lever arm *d*, the inner end of the lever having a movable engagement as shown with the rod *g*, as by means of an elongated slot 3 engaging a pin 4 upon the rod *g*. As stated in the application referred to, the opposite end of the lever 1 may be actuated in various ways within the scope of my invention to vertically move the rod or shaft *g*.

In Fig. 2 the post *m* is shown provided with a cam indicated at 5, with which the adjacent end of the lever 1 is in engagement. By this construction it will be evident that when the shaft *m* is partially rotated the lever 1 will be actuated. The hand grip is shown held in normal position by the tension of a spring 6 bearing upon a friction toothed collar 7 contacting with an adjacent friction or toothed portion of the lever arm *d*.

It will be observed that the swinging of the entire lever arm *d* about its mounting upon the center of the steering wheel will clearly impart to the tubular casing or shaft a corresponding movement. It will also be evident that when the hand grip *h* is partially rotated upon its axis, the rod *g* will be correspondingly moved vertically. The swinging of the lever arm and the partial rotation of the hand grip may occur simultaneously or independently the one of the other, as may be desired. The hand grip being mounted upon the outer end of the lever arm $d$ it will be obvious that the operator seizing the hand grip may simply throw the lever arm over the desired arc without rotating the hand grip, or the two actions may take place simultaneously, as above described with one hand of the operator, while of course the hand grip may be rotated upon its axis without actuating the lever arm.

The arm $d$ is provided with a pawl indicated at $r$ to engage the toothed segment $e$ to hold the arm in any given location.

It will be evident that in applicant's device by grasping the hand grip $h$ and moving it forward, or in other words carrying the hand grip along without rotating it upon its axis, the lever $l$ is not actuated to cause a vertical movement of the staff. The lever arm $d$ with the hand grip $h$ may thus be moved forward or along the segment in either direction simultaneously without operating the staff $g$ or the spark controlling device.

It is evident also that the hand grip may be rotated upon its axis independently of the movement of the lever arm. Obviously, also, the hand grip can be rotated upon its axis simultaneously with the movement of the lever arm $d$ by a single hand of the operator.

It will be noted that with the construction described, either, or both, of the separate controlling devices can be actuated by a movement in a single plane; that is, the operator, by grasping the rotatable handle, can swing the arm simultaneously, rotating the handle upon its axis, both movements being in the same plane. This greatly facilitates the control, as the relative proper adjustment of the two separate controlling devices are actuated by separate members, or by the same member where the respective movements are in different planes.

What I claim as my invention is:

1. In a controlling mechanism for automobiles the combination of a steering post, a steering rim to actuate said post, a rotatable shaft to control the throttle valve of the carbureter, a vertically reciprocatory staff to actuate the spark controlling device, means to actuate said shaft, and a hand grip rotatable upon an upwardly extended axis to vertically reciprocate said staff, the staff and the shaft being movable simultaneously by one hand of the operator or each independently the one of the other at the will of the operator.

2. In a controlling mechanism for automobiles the combination of a steering post, a rotatable shaft to control the throttle valve of the carbureter, a vertically movable staff to actuate the spark controlling device, an oscillatory lever arm to rotate said shaft, and a hand grip rotatable upon an upwardly extended axis carried upon said lever to reciprocate said staff, said hand grip rotatable upon its axis independently of the movement of the lever arm.

3. In a controlling mechanism for automobiles the combination of a steering post, a shaft to control the throttle valve of the carbureter, a vertically reciprocatory staff to actuate the spark controlling device, an oscillatory lever arm to rotate said shaft, a lever to reciprocate said staff, and a hand grip rotatable upon an upwardly extended axis carried upon said lever arm to actuate said lever.

4. In a controlling mechanism for automobiles the combination of a steering post, a shaft to control the throttle valve of the carbureter, a vertically reciprocatory staff to actuate the spark controlling device, a horizontally oscillatory lever arm to rotate said shaft, a lever to vertically reciprocate said staff engaged at one extremity with the staff, and a hand grip rotatable upon its axis engaged with the opposite end of said lever to actuate said lever.

5. In a controlling mechanism for automobiles the combination of a steering post, a rotatable shaft to control the throttle valve of the carbureter, a vertically movable staff to actuate the spark controlling device, an oscillatory lever arm to rotate said shaft, a hand grip rotatable upon an upwardly extended axis to vertically reciprocate said staff, said hand grip movable simultaneously with the oscillatory lever in the direction of the movement of the lever without reciprocating said staff, and rotatable upon its axis independently of the movement of the lever arm to reciprocate said staff.

6. The combination with a steering stem, of two members passing through said stem respectively rotatable and longitudinally movable, a common actuating member rotatable in the same plane about the axis of the stem and its own axis, and means for translating said rotations into the respective movements of the members passing through the stem.

7. The combination with a steering stem, of two members passing through said stem and respectively rotatable and longitudinally movable, an actuating member for said rotatable member, a member mounted on said actuating member for operating the same and rotatable in the same plane about an eccentric axis, and means for translating said rotations about the eccentric axis into movement of the longitudinally movable member in said stem.

8. In a control mechanism for automobiles, the combination of a steering post, of a shaft and a staff associated therewith, a horizontally oscillatory lever arm for actuating said shaft, a lever for operating said staff, a hand grip for actuating said lever rotatable in the same plane as said lever arm and journaled thereon.

In testimony whereof, I have signed this specification in the presence of two subscribing witnesses.

HOWARD E. COFFIN.

Witnesses:
N. S. WRIGHT,
CHARLES F. HEYERMAN.